US011720119B1

(12) United States Patent
Cui et al.

(10) Patent No.: US 11,720,119 B1
(45) Date of Patent: Aug. 8, 2023

(54) PATH PLANNING METHOD OF MOBILE ROBOTS BASED ON IMAGE PROCESSING

(71) Applicant: Jilin University, Changchun (CN)

(72) Inventors: An Cui, Changchun (CN); Tianmengyu Liang, Changchun (CN); Liyuan Liu, Changchun (CN); Yaohui Ma, Changchun (CN); Yingping Xu, Changchun (CN); Mengmeng Yang, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 0 days.

(21) Appl. No.: 17/945,883

(22) Filed: Sep. 15, 2022

(30) Foreign Application Priority Data

Jan. 25, 2022 (CN) .......................... 202210087144.X

(51) Int. Cl.
| G05D 1/02 | (2020.01) |
| G06T 7/11 | (2017.01) |
| G06T 7/136 | (2017.01) |
| G06T 7/60 | (2017.01) |
| G06T 7/73 | (2017.01) |

(52) U.S. Cl.
CPC ......... G05D 1/0274 (2013.01); G05D 1/0214 (2013.01); G06T 7/11 (2017.01); G06T 7/136 (2017.01); G06T 7/60 (2013.01); G06T 7/73 (2017.01); *G06T 2207/20044* (2013.01)

(58) Field of Classification Search
CPC .... G05D 1/0274; G05D 1/0214; G06T 7/136; G06T 7/11; G06T 7/73; G06T 7/60; G06T 2207/20044
See application file for complete search history.

(56) References Cited

U.S. PATENT DOCUMENTS

| 11,037,320 B1* | 6/2021 | Ebrahimi Afrouzi ..... G06T 7/90 |
| 2021/0154840 A1* | 5/2021 | Vogel ..................... B25J 9/1666 |
| 2021/0349467 A1* | 11/2021 | Toyoura ............... G01C 21/206 |
| 2022/0061616 A1* | 3/2022 | Yoon ..................... G01S 7/4811 |

(Continued)

OTHER PUBLICATIONS

Liang yu, "Path planning of AGV intelligent vehicle based on improved Dijkstra algorithm", Science and Technology & Innovation, 2020, issue 24.

(Continued)

*Primary Examiner* — Hussein Elchanti

(74) *Attorney, Agent, or Firm* — Zhigang Ma

(57) ABSTRACT

A path planning method of mobile robots based on image processing is provided and includes: S1, preprocessing a map image: calculating a safety distance between a mobile robot and a surrounding obstacle during a movement of the mobile robot based on external geometric features of the mobile robot, forming a circular range on the map image with a expansion point as a center and the safety distance as an expansion radius to set a safety range, and marking the safety range; performing skeleton feature extraction on the map image after the marking to obtain a reference path map; S2, obtaining an initial path; and S3, optimizing the initial path. The path planning method improves the flexibility of the algorithm and has high robustness and operational efficiency, and the optimal path obtained can ensure the moving safety of the mobile robot.

5 Claims, 7 Drawing Sheets

(56) References Cited

U.S. PATENT DOCUMENTS

2022/0167814 A1* 6/2022 Inoue .................... A47L 9/2805

OTHER PUBLICATIONS

Wei yuliang et al., "Intelligent vehicle path planning based on neural network Q-learning algorithm", Fire Control&Command Control, Feb. 2019, vol. 44, No. 2.

Li-Fei Song et al., "A global path planning Algorithm for AGV based on the Shapefile Vectorgraph", Advanced Materials Research, Feb. 6, 2014, pp. 1117-1120, vols. 889-890.

Jianzhong Huang et al., "A Path-Planning Algorithm for AGV Based on the Combination Between Ant Colony Algorithm and Immune Regulation", Advanced Materials Research, Dec. 6, 2011, pp. 3-9, vol. 422.

Xiong He et al., "Algorithm based on Layering Search to Routes Planning of Vehicle Navigation System", Applied Mechanics and Materials, Nov. 12, 2012, pp. 749-754, vol. 214.

Daniel Delling et al., "Customizable Route Planning", Microsoft Research Silicon Valley, Karlsruhe Institute of Technology.

Martin Tammvee et al., "Human activity recognition-based path planning for autonomous vehicles", Signal, Image and Video Processing, Aug. 2020.

Lin Lin et al., "Network model and effective evolutionary approach for AGV dispatching in manufacturing system", J Intell Manuf, 2006.

Peter Sanders et al., "Engineering Highway Hierarchies", Universität Karlsruhe (TH), 76128 Karlsruhe, Germany.

CNIPA, Notification to grant patent right for invention in CN202210087144.X, Jul. 12, 2022.

Jilin University (Applicant), Allowed claims for invention in CN202210087144.X, Jan. 25, 2022.

* cited by examiner

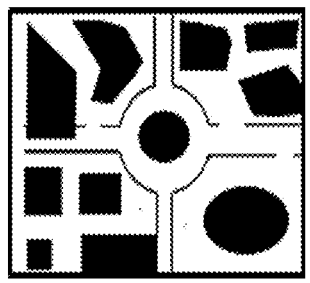 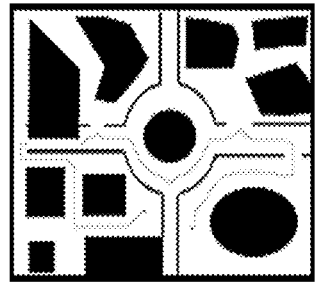 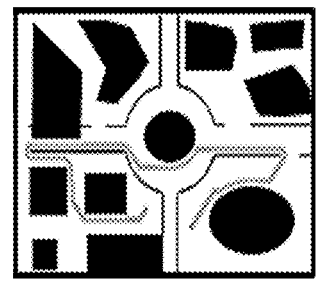
FIG. 18A          FIG. 18B          FIG. 18C
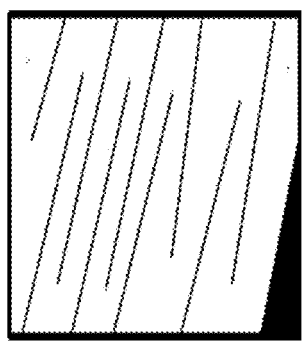 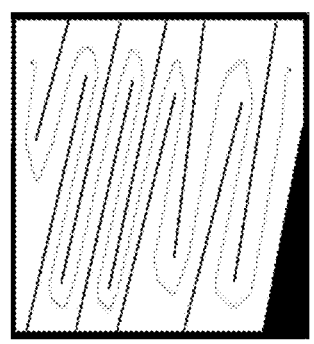 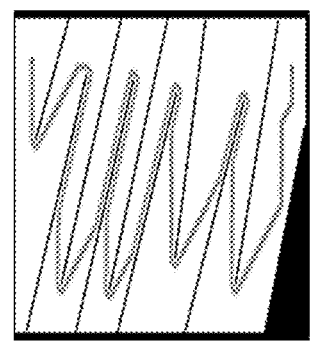
FIG. 19A          FIG. 19B          FIG. 19C
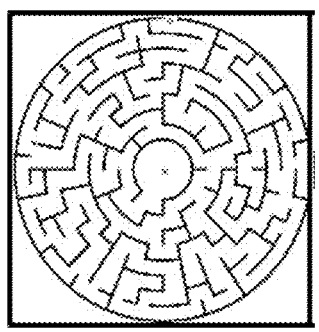 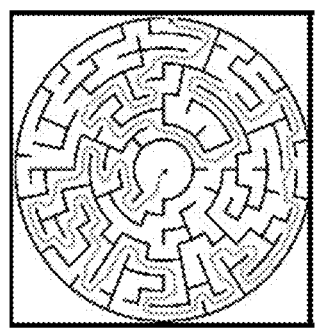 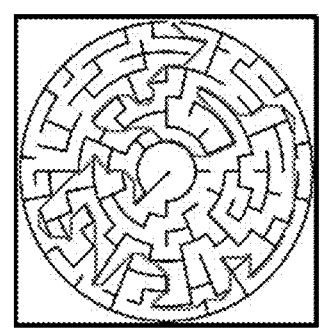
FIG. 20A          FIG. 20B          FIG. 20C

PATH PLANNING METHOD OF MOBILE ROBOTS BASED ON IMAGE PROCESSING

TECHNICAL FIELD

The disclosure relates to the field of intelligent robot technologies, particular to a path planning method of mobile robots based on image processing.

BACKGROUND

Mobile robots are intelligent machines that can move continuously and autonomously in various environments. Their development has a significant impact on national defense, society, economy and science and technology, and has become a strategic study target in national high-tech fields. Path planning is an indispensable part of a behavior planning system of the mobile robot, which obtains an optimal path through specific arithmetic solutions based on map information of the surrounding environment to guide the mobile robot to complete a motion task with minimum cost. The study of the path planning is essential for the study and development of the mobile robots.

In the study of path planning algorithms, two most important aspects are map modeling and algorithm design. Current map formats are mainly grip map, directed map and undirected map. The grip map is represented by a binary matrix. The binary matrix has only 0 and 1 elements, which represent obstacles and moveable space, respectively. The directed and undirected maps, on the other hand, are represented by adjacency matrices. The maps in these formats cannot specifically represent the geometry of obstacles or paths when representing the working environment of the mobile robot, and the map modeling process is extremely complex, requiring human input of information about the working environment, and the workload and time for map building can increase dramatically when the working environment is too large.

At present, mainstream algorithms of the path planning mainly include Dijkstra's algorithm, A* algorithm, ant colony algorithm and particle swarm algorithm. In the study of the path planning, the mobile robot is usually regarded as a mass point, and static geometric features of the mobile robot are not considered, resulting in the risk of collision when the mobile robot travels by trajectory. Liang Yu introduced an estimation function for the problem of large path search range and low efficiency of Dijkstra's algorithm to estimate the path cost and finally plan the shortest path. Huang Jian-Zhong et al. combined the ant colony algorithm and immune algorithm to improve the convergence speed of the ant colony algorithm and solve the problem of easily falling into local optimum in the planning process. Wei Yu-Liang et al. proposed a neural network-based Q-Learning algorithm, which improved the convergence speed and obstacle avoidance performance of the Q-Learning algorithm by establishing a radial basis function (RBF) neural network. Song Li-Fei et al. proposed a global path planning algorithm based on shape vector map; He Xiong et al. introduced the concept of hierarchical search into the path planning algorithm, which improved the solution efficiency of the algorithm; Daniel Delling et al. proposed an improved acceleration algorithm; Peter Sanders et al. proposed an acceleration algorithm that can be used in road engineering; Martin Tammvee et al. proposed a path planning algorithm to guide the movement of mobile robots by simulating human behavioral activities; Lin Lin et al. proposed an automated guided vehicle (AGV) scheduling system algorithm based on an improved genetic algorithm.

By analyzing the existing technologies, it can be found that in the study of path planning algorithms, the map formats that most of the algorithms can solve are the grid map, the directed map and the undirected map, which are less flexible. At the same time, since the mobile robot has its own geometry, the research method of treating it as a mass point cannot guarantee that it does not collide with the surrounding obstacles during its movement.

Therefore, it is an urgent problem for those skilled in the art to design an algorithm or method that can consider the moving safety of the mobile robots and can handle maps with high flexibility.

SUMMARY

In view of this, the disclosure provides a path planning method of mobile robots based on image processing.

In order to achieve the above purpose, the disclosure uses the following technical solutions.

The path planning method of mobile robots based on image processing, including the following steps:

S1, preprocessing of a map image: calculating a safety distance s between a mobile robot and a surrounding obstacle during a movement of the mobile robot based on external geometric features of the mobile robot, forming a circular range on the map image with an expansion point as a center and the safety distance s as a expansion radius to set a safety range, and marking the safety range; performing skeleton feature extraction on the map image after the marking to obtain a reference path map;

S2, obtaining of an initial path: building an adjacency matrix, and performing path solution on the reference path map based on the adjacency matrix to obtain the initial path;

S3, optimizing the initial path:

S31, performing neighborhood expansion on the initial path to obtain an expansion path;

S32, performing segmentation on the expansion path to obtain n numbers of segmented paths, and optimizing the n numbers of segmented paths separately to obtain optimized segmented paths;

S33, splicing the optimized segmented paths to obtain an optimized full path.

In an embodiment, the preprocessing of the map image in the S1 further includes:

binarizing the map image to obtain a binarized map image, and setting the safety range on the binarized map image.

In an embodiment, setting the safety range and marking the safety range in the S1 concretely includes:

S11, calculating the safety distance and the safety range based on the external geometric features of the mobile robot;

S12, identifying all boundary points of the obstacle on the map image;

S13, obtaining coordinates of one of the boundary points;

S14, marking points in the map image within a circular safety range set with the one of the boundary points of the obstacle as a center as 0;

S15, repeating the S13 to the S14 until all boundary points are set with safety ranges.

In an embodiment, the S32 concretely includes:

S321, determining a segment length cd of each segmented path;

S322, searching each path point on the initial path and obtaining coordinates of all path points in each segmented path;

S323, calculating minimum and maximum values of horizontal and vertical coordinates in coordinate points, respectively, for each segmented path, and the minimum and maximum values being denoted as: $[i_{min}:i_{max}, j_{min}:j_{max}]$;

S324, calculating a size of an area to be extracted by $i_{min}$, $i_{max}$, $j_{min}$, $j_{max}$;

$$w = i_{max} - i_{min} + 1;$$

$$l = j_{max} - j_{min} + 1;$$

where w is a width of an extracted area, and l is a length of the extracted area;

S325, the extracted area for each segmented path being denoted as: $[i_{min}:i_{max}, j_{min}:j_{max}]$;

S326, building an adjacency matrix for each segmented path;

S327, optimizing each segmented path; and

S328, obtaining optimization results for all segmented paths.

In an embodiment, the S33 concretely includes:

S331, setting a coordinate matrix of the segmented path;

S332, deleting redundant points on each segmented path to obtain a further optimized segmented path;

S333, recording the coordinates (i, j) of each path point in each segmented path;

S334, obtaining a coordinate position of each path point in the map image and recording the coordinate position:

$$\begin{cases} i' = i_{min} + i - 1; \\ j' = j_{min} + j - 1; \end{cases}$$

where (i', j') is the coordinate of the path point in the map image;

S335, inputting the coordinates (i', j') of the path points of each segmented path into the path coordinate matrix in turn to complete the splicing of the segmented paths.

As can be seen from the above technical solutions, compared with the related art, the disclosure discloses the path planning method of mobile robots based on image processing, which is simple, highly flexible and can ensure the moving safety of the mobile robots, using the image containing environmental information as the map, proposing an automatic generation method of the adjacency matrix, reducing the difficulty and complexity of map building; by preprocessing the map image and setting the safety distance, the moving safety of the mobile robot is ensured and the operation efficiency of the solutions is improved; through Dijkstra's algorithm and the methods of path segmentation and path splicing, the optimal path of the mobile robot in the scene can be obtained. The simulation results show that the method improves the flexibility of the path planning algorithm, has high robustness and solution efficiency, and the obtained optimal path can guarantee the moving safety of the mobile robot.

BRIEF DESCRIPTION OF THE DRAWINGS

In order to explain embodiments of the disclosure or technical solutions of the related art more clearly, the drawings needed to be used in the description of the embodiments or the related art will be briefly introduced below. It is obvious that the drawings in the description below are only the embodiments of the disclosure. For those skilled in the art, other drawings can also be obtained according to the provided drawings without creative labor.

FIGS. 18A to 18C illustrate schematic diagrams of map90 and its initial path and optimal path simulation results in a simulation experiment according to an embodiment of the disclosure.

FIGS. 19A to 19C illustrate schematic diagrams of map50 and its initial path and optimal path simulation results in a simulation experiment according to an embodiment of the disclosure.

FIGS. 20A to 20C illustrate schematic diagrams of map91 and its initial path and optimal path simulation results in a simulation experiment according to an embodiment of the disclosure.

DETAILED DESCRIPTION OF THE EMBODIMENTS

The technical solutions in the embodiments of the disclosure will be clearly and completely described below in conjunction with the accompanying drawings in the embodiments of the disclosure, and it is clear that the described embodiments are only some of the embodiments of the disclosure, and not all of them. Based on the embodiments in the disclosure, all other embodiments obtained by those skilled in the art without making creative labor fall within the scope of protection of the disclosure.

Every pixel point in the map image can be involved in the operation, resulting in a huge amount of data and low efficiency of the algorithm operation. At the same time, considering external geometric features of the mobile robot to avoid collision with objects in the surrounding environment during its movement, the images need to be preprocessed to obtain a safe reference path map.

Figure 1:
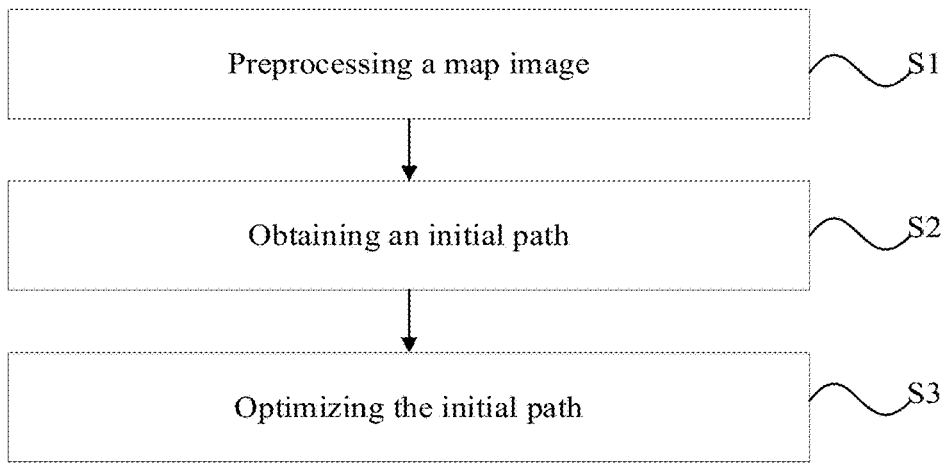
FIG. 1 illustrates a flowchart of a path planning method of mobile robots based on image processing according to an embodiment of the disclosure.
Figure 4:
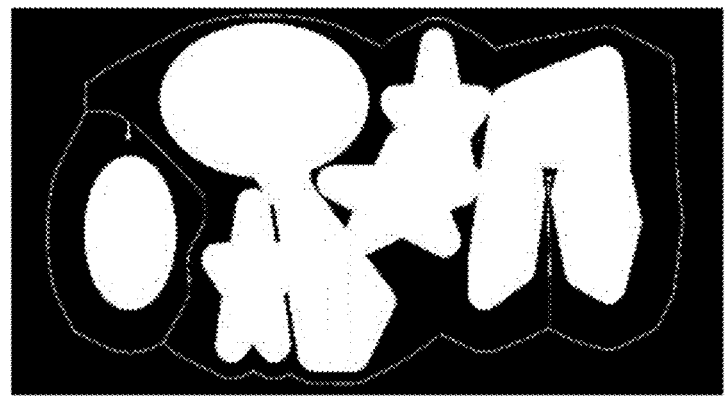
FIG. 4 illustrates a schematic diagram of a reference path map in the path planning method of mobile robots based on image processing according to an embodiment of the disclosure.

The embodiment of the disclosure provides a path planning method of mobile robots based on image processing, as shown in FIG. 1, the method includes the following steps:

S1, preprocessing of a map image: based on external geometric features of a mobile robot, calculating a safety distance s between the mobile robot and surrounding obstacles during its movement, forming a circular range with an expansion point as a center and a safety distance s as an expansion radius on the map image to set a safety range, and marking the safety range; performing skeleton feature extraction on the map image after marking to obtain a reference path map, as shown in FIG. 4.

S2, obtaining of an initial path: building an adjacency matrix and performing path solution on the reference path map based on the adjacency matrix to obtain the initial path.

S3, optimizing the initial path:

S31, performing neighborhood expansion on the initial paths to obtain an expansion path.

S32, segmenting the expansion path to obtain n numbers of segmented paths, and optimizing them separately for each segmented path;

S33, splicing the optimized segmented paths to obtain an optimized full path.

To further implement the above technical solution, the process of preprocessing the map image in the S1 further includes:

binarizing the map image to obtain a binarized map image, and setting the safety range on the binarized map image.

Note that:

Let $r_i$ be a distance from a point on the mobile robot in the horizontal plane to a center of turning a corner of the mobile robot, in order to make the mobile robot in movement without collision with the obstacle, the safety distance s should satisfy the following condition:

$$s \geq \max(r_i).$$

In this embodiment, Dijkstra's algorithm is used for initial path solving. Dijkstra's algorithm is implemented based on the adjacency matrix. The adjacency matrix is a matrix that represents the distance among moveable points in the path. The horizontal and vertical coordinates in the matrix represent the movable points. And the elements in the matrix represent the through-joining relationship between two points, 0 means no connection between the two points, and the rest of the numbers represent the distance between the two points.

Figure 5:
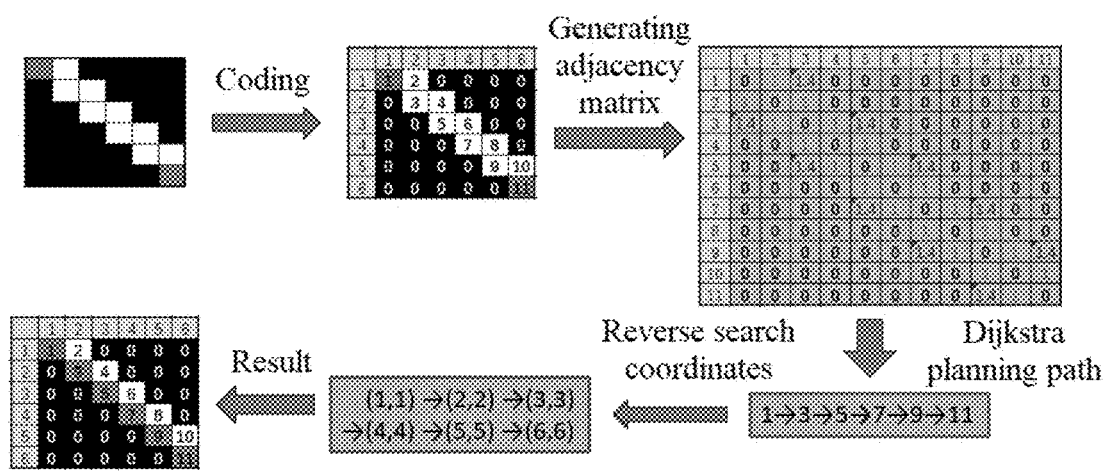
FIG. 5 illustrates a schematic diagram of an adjacency matrix generation method in the path planning method of mobile robots based on image processing according to an embodiment of the disclosure.

The process of building the adjacency matrix and the reverse conversion process from the adjacency matrix to the map image are shown in FIG. 5.

Figure 6:
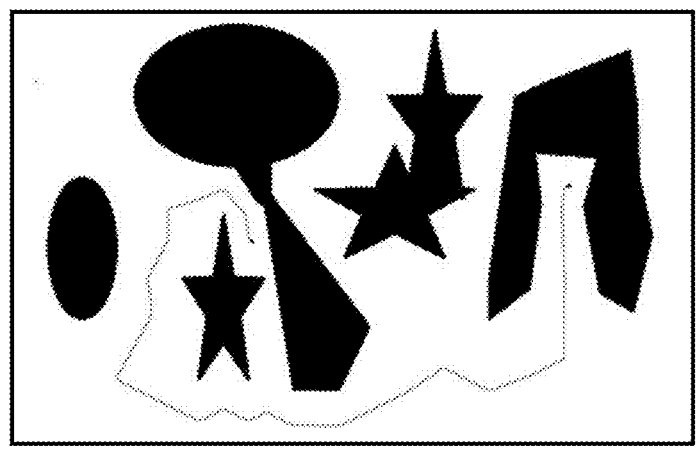
FIG. 6 illustrates a schematic diagram of an initial path in the path planning method of mobile robots based on image processing according to an embodiment of the disclosure.

The Dijkstra's algorithm is further used in this embodiment to solve the path for the reference path map to obtain the initial path, as shown in FIG. 6.

In order to prevent the mobile robot from "rubbing" when following the track and reduce the possibility of collision of the mobile robot, setting a safety distance coefficient α greater than 1, and the safety distance is:

$$s = \alpha \cdot \max(r_i).$$

Figure 2:
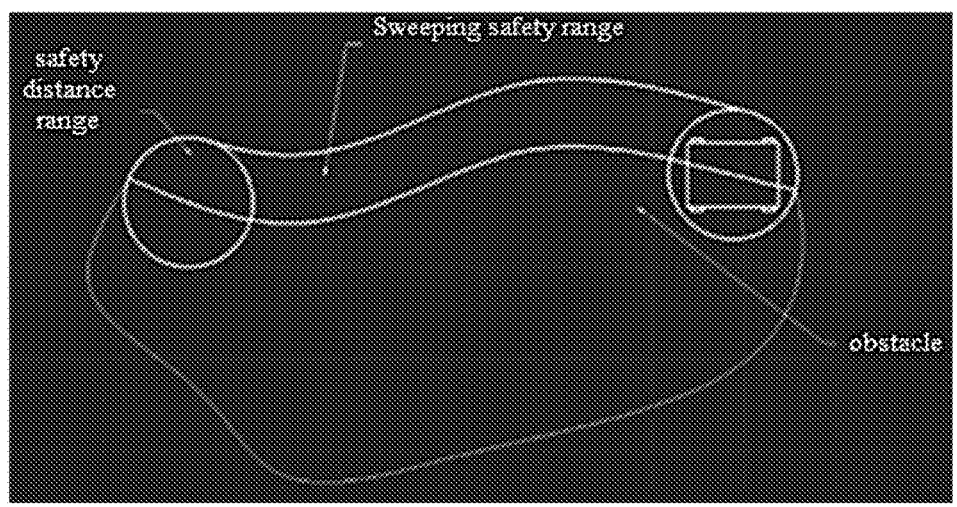
FIG. 2 illustrates a schematic diagram of a safe distance setting process in the path planning method of mobile robots based on image processing according to an embodiment of the disclosure.

To further implement the above technical solution, as shown in FIG. 2, the specifics of setting and marking the safety range in the S1 include:

S11, calculating the safety distance of the mobile robot and calculating the safety range based on the external geometric features of the mobile robot;

S12, identifying all boundary points of the obstacles on the map image;

S13, obtaining coordinates of one of the boundary points;

S14, marking all points within the circular safety range set at the center of the one boundary point in the map image as 0;

S15, repeating the S13 to the S14 until all the boundary points are set with the safety ranges.

Note that:

Using the interpoint marking method, any location in the blank part of the map is designated as the start/end point as needed, and then the safety range is automatically marked by the interpoint marking method according to the designated location after designation.

The mathematical representation is as follows.

$$f(x, y) = \begin{cases} 0, & |x - x_0||y - y_0| \text{ is odd number} \\ 1, & \text{other} \end{cases}.$$

Figure 3A:
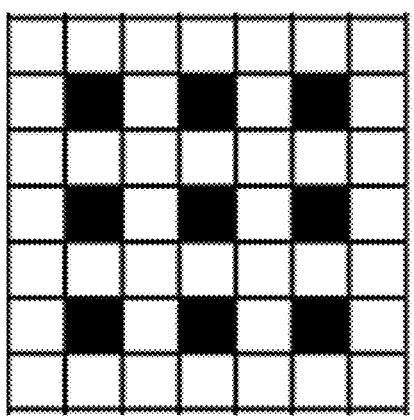
FIGS. 3A to 3B illustrate schematic diagrams of an interpoint marking method and a marking effect respectively in the path planning method of mobile robots based on image processing according to an embodiment of the disclosure.
Figure 3B:
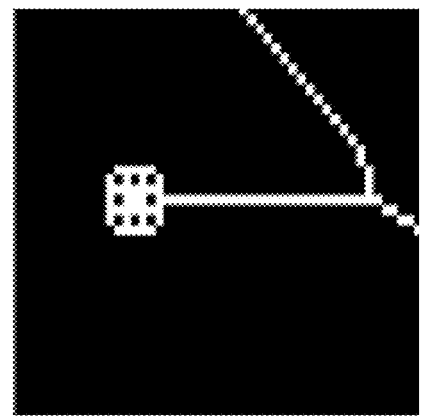

After using the interpoint marking method, the effect is shown in FIG. 3B.

To further implement the above technical solution, the specifics of the S32 include:

S321, determining the segment length cd of each segmented path;

S322, searching each path point on the initial path and obtaining the coordinates of all path points in each segmented path;

S323, calculating, for each segmented path, the minimum and maximum values of the horizontal and vertical coordinates in the coordinate points, noted as: $[i_{min}:i_{max}, j_{min}:j_{max}]$;

S324, calculating a size of the area to be extracted by $i_{min}$, $i_{max}$, $j_{min}$, $j_{max}$:

$$w = i_{max} - i_{min} + 1;$$

$$l = j_{max} - j_{min} + 1;$$

where w is a width of an extracted area and l is a length of the extracted area;

S325, the extracted area for each segmented path being: $[i_{min}:i_{max}, j_{min}:j_{max}]$;

S326, building an adjacency matrix of each segmented path;

S327, optimizing each segmented path;

S328, obtaining an optimization result of all segmented paths.

Figure 7:
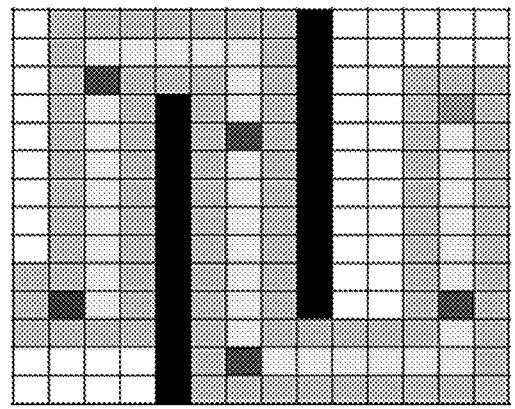
FIG. 7 illustrates a schematic diagram of segmented paths in the path planning method of mobile robots based on image processing according to an embodiment of the disclosure.
Figure 8:
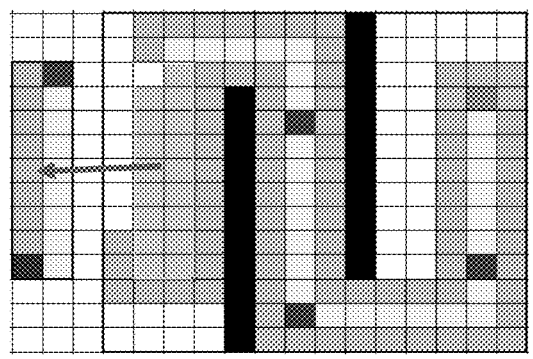
FIG. 8 illustrates a schematic diagram of segmented path extraction in the path planning method of mobile robots based on image processing according to an embodiment of the disclosure.
Figure 9:
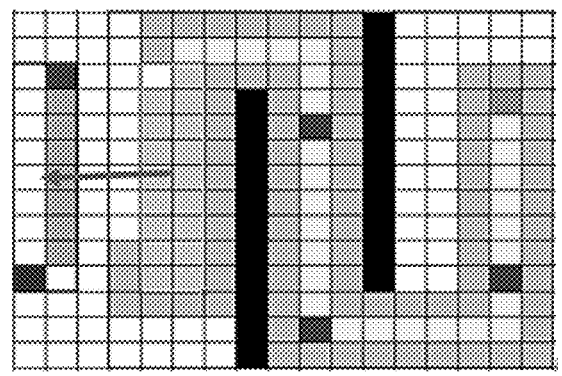
FIG. 9 illustrates a schematic diagram of segmented path optimization in the path planning method of mobile robots based on image processing according to an embodiment of the disclosure.
Figure 10:
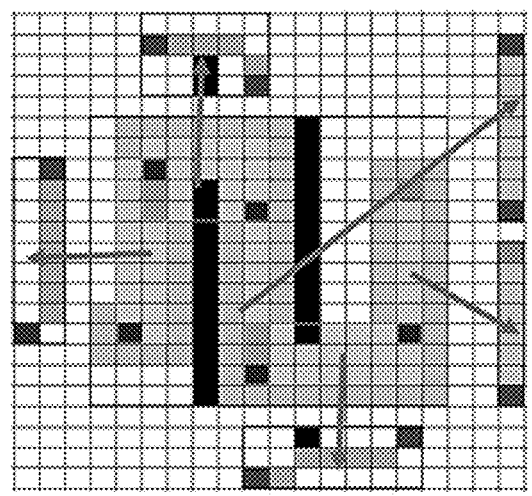
FIG. 10 illustrates a schematic diagram of an optimization result of all segmented paths in the path planning method of mobile robots based on image processing according to an embodiment of the disclosure.

It is important to note that:

In this embodiment, the segment length cd of the segmented path is determined, and the length can be set to [500,1000], as shown in FIG. 7, and a segmented path is extracted as shown in FIG. 8; the segmented path is optimized as shown in FIG. 9, and the optimization result of all segmented paths is obtained as shown in FIG. 10.

It should be noted that nodes of the segments are not able to participate in the optimization process when the optimization is performed multiple times, which will reduce the optimization effect of the algorithm. Therefore, the mode of multiple segment length cd recycling can be used, so that the nodes of each segment can participate in the optimization process in the next segment optimization process.

To further implement the above technical solution, the specifics of the S33 include:

S331, setting the coordinate matrix of the segmented paths;

S332, removing redundant points on each segmented path to obtain a further optimized segmented path;

S333, recording the coordinates (i, j) of each path point in each segmented path;

S334, obtaining the coordinate position of each path point in the map image and recording is:

$$\begin{cases} i' = i_{min} + i - 1; \\ j' = j_{min} + j - 1; \end{cases}$$

where (i', j') is the coordinates of the path point in the map image.

S335, inputting the coordinates of the path points on each segmented path into the path coordinate matrix in turn to complete the splicing of the segmented paths.

Figure 11:
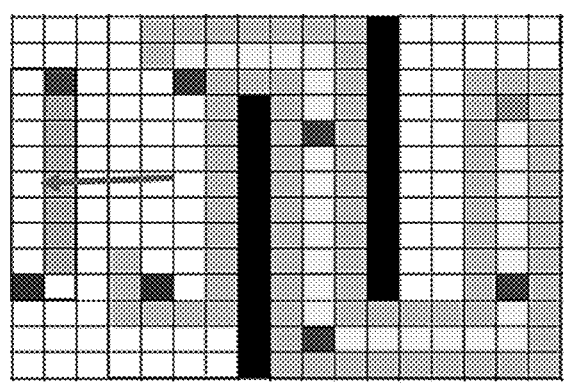
FIG. 11 illustrates a schematic diagram of an optimized path after further optimizing the segmented path in the path planning method of mobile robots based on image processing according to an embodiment of the disclosure.
Figure 12:
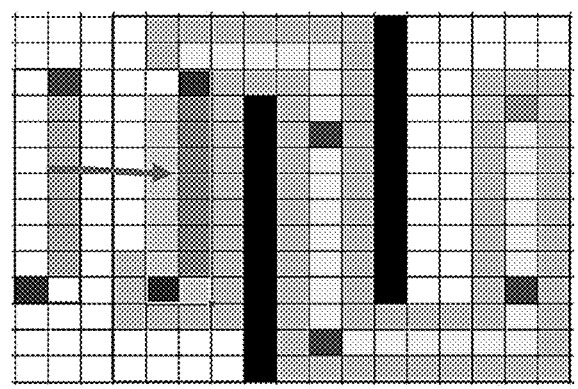
FIG. 12 illustrates a schematic diagram of a process of putting all the coordinates of the path points into the path coordinate matrix after the optimization of the first segmented path in the path planning method of mobile robots based on image processing according to an embodiment of the disclosure.
Figure 13:
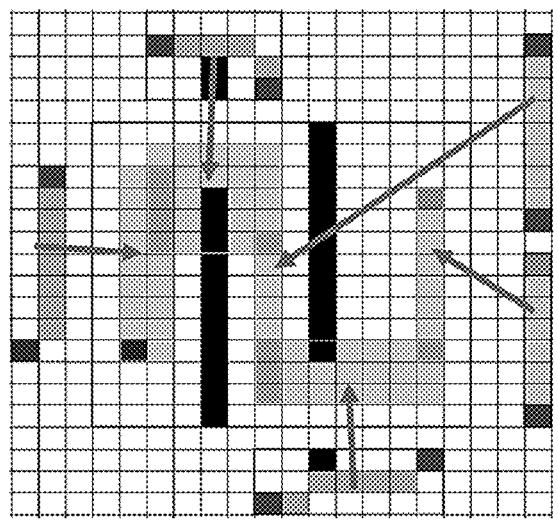
FIG. 13 illustrates a schematic diagram of a process of putting all path points of all segmented paths into the path coordinate matrix in the path planning method of mobile robots based on image processing according to an embodiment of the disclosure.
Figure 14:
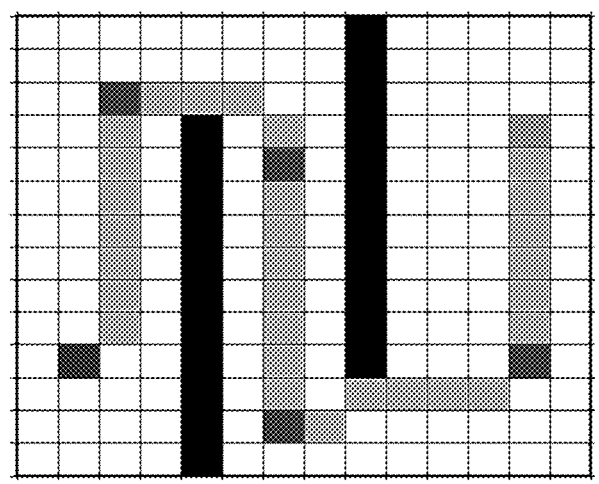
FIG. 14 illustrates a schematic diagram of a path after splicing in the path planning method of mobile robots based on image processing according to an embodiment of the disclosure.
Figure 15:
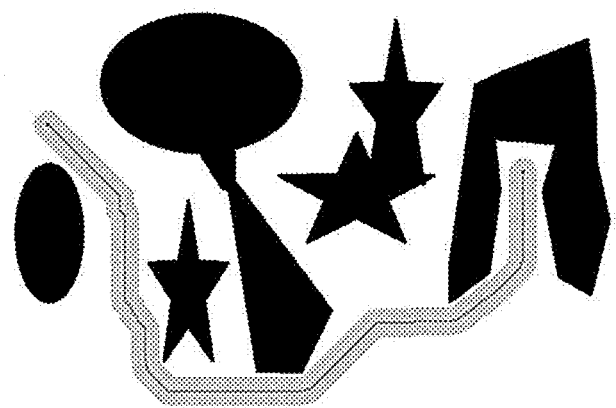
FIG. 15 illustrates a schematic diagram of an optimal path displayed in the map image in the path planning method of mobile robots based on image processing according to an embodiment of the disclosure.

Note that:

the optimized path is obtained after further optimization of the segmented path as shown in FIG. 11; the coordinates of all the path points in the segmented path after the optimization of the first segmented path are all put into the path coordinate matrix as shown in FIG. 12; the process of putting all the path points in all the segmented paths into the path coordinate matrix is shown in FIG. 13; the path after the splicing is completed is shown in FIG. 14, and the final obtained path is displayed in the map image is shown in FIG. 15.

The disclosure will be further illustrated by simulation validation as follows.

1. Multi-Obstacle Environment Map Image

Figure 16A:
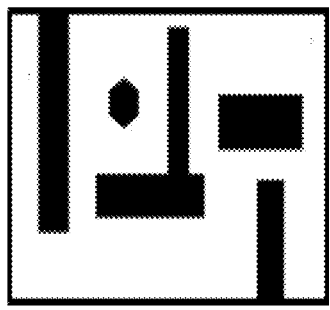
FIGS. 16A to 16C illustrate schematic diagrams of map6 and its initial path and optimal path simulation results in a simulation experiment according to an embodiment of the disclosure.
Figure 16B:
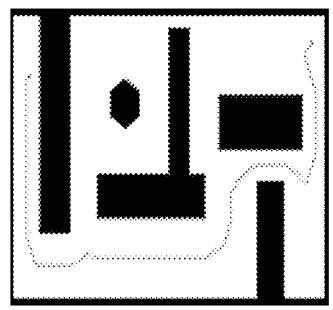
Figure 16C:
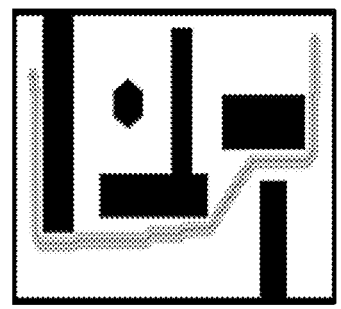
Figure 17A:
FIGS. 17A to 17C illustrate schematic diagrams of map4 and its initial path and optimal path simulation results in a simulation experiment according to an embodiment of the disclosure.
Figure 17B:
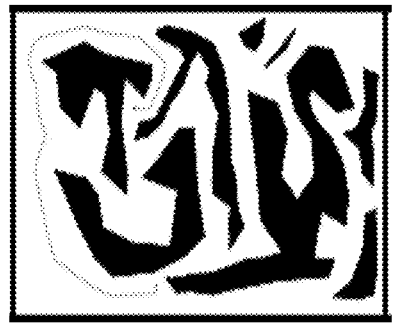
Figure 17C:
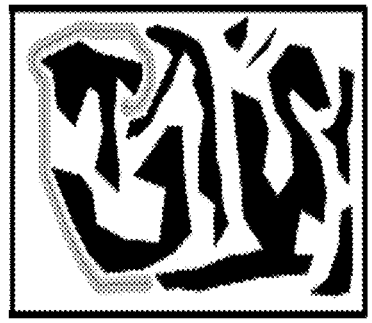

The multi-obstacle environment map, which contains multiple, multi-shaped obstacles inside, is mainly used to test and debug the solution and verify whether its performance can meet the requirements. As shown in FIGS. 16A to 16C, FIGS. 17A to 17C and FIGS. 18A to 18C, (where FIGS. 16A, 17A and 18A are map6, map4 and map90 respectively, FIGS. 16B, 17B and 18B are the initial paths corresponding to the above maps, and FIGS. 16C, 17C and 18C are the optimal paths corresponding to the above maps). By solving the multi-obstacle environment map, it is found that the optimal path planned by this solution can ensure the safety of the mobile robot when moving and is the shortest path of the global optimal. During the operation of the solution, the flexibility is high and no error reporting problem occurs; and the robustness is high and the solving efficiency is fast.

2. Special Environment Map Image

The special environment map is a map with a special shape and generally has some specific test purpose, which is mainly used to check the adaptability of the scheme in some extreme situations or to individually test a certain performance of the scheme. As shown in FIGS. 19A to 19C, by solving and verifying the special map, it is found that when the scheme solves for the extra-long path, the efficiency of solving to get the initial path is faster, but the efficiency of optimizing the initial path is lower. As shown in FIGS. 20A to 20C, by solving the maze-type map, the path-finding capability of the disclosure is outstanding, and it is a major advantage of the scheme in terms of both path-finding efficiency and path-finding speed. (FIGS. 19A and 20A show map50 and map91, respectively, FIGS. 19B and 20B show the initial paths obtained by solving map50 and map91, respectively, and FIGS. 19C and 20C show the optimal paths obtained by solving map50 and map91, respectively.).

The disclosure proposes the path planning method of mobile robots based on image processing. The image containing environmental information is used as the environment map to improve the efficiency of map building; the method of image preprocessing and setting safety distance is used to ensure the moving safety of the mobile robot and to improve the operation efficiency of the scheme; the optimal path can be obtained by using Dijkstra's algorithm and combining path segmentation and path splicing methods. Through the simulation verification of the scheme, it is found that the scheme improves the flexibility of the algorithm, has high robustness, operation efficiency, and the obtained optimal path can guarantee the moving safety of the mobile robot.

In this specification, each embodiment is described in a progressive manner. Each embodiment focuses on the differences from other embodiments. The same and similar parts of each embodiment can be referred to each other. For the device disclosed in the embodiment, since it corresponds to the method disclosed in the embodiment, the description is relatively simple, and please refer to the description of the method section for relevant parts.

The above description of the disclosed embodiments enables those skilled in the art to realize or use the disclosure. Various modifications to these embodiments will be apparent to those skilled in the art, and the general principles defined in the disclosure can be implemented in other embodiments without departing from the spirit or scope of the disclosure. Therefore, the disclosure will not be limited to the embodiments shown in the disclosure, but will conform to the widest scope consistent with the principles and novel features disclosed in the disclosure.

What is claimed is:

1. A path planning method of mobile robots based on image processing, comprising:
preprocessing of a map image: calculating a safety distance s between a mobile robot and a surrounding obstacle during a movement of the mobile robot based on external geometric features of the mobile robot, forming a circular range on the map image with a boundary point of the obstacle as a center and the safety distance s as a expansion radius to set a safety range, and marking the safety range; performing skeleton feature extraction on the map image after the marking to obtain a reference path map;
obtaining of an initial path: building an adjacency matrix, and performing path solution on the reference path map based on the adjacency matrix to obtain the initial path;
optimizing the initial path:
  performing neighborhood expansion on the initial path to obtain an expansion path;
  performing segmentation on the expansion path to obtain n numbers of segmented paths, and optimizing the n numbers of segmented paths separately;
  splicing the n numbers of segmented paths after the optimizing to obtain an optimized full path;
wherein the performing segmentation on the expansion path to obtain n numbers of segmented paths, and optimizing the n numbers of segmented paths separately, comprises:
  determining a segment length cd of each of the n numbers of segmented paths;
  searching each of path points on the initial path and obtaining coordinates of the path points in each the segmented path;
  calculating minimum and maximum values of horizontal and vertical coordinates in coordinate points, respectively, for each the segmented path, and the minimum and maximum values being denoted as: $[i_{min}:i_{max}, j_{min}:j_{max}]$;
  calculating a size of an area to be extracted by $i_{min}$, $i_{max}$, $j_{min}$, $j_{max}$;

$w = i_{max} - i_{min} + 1$;

$l = j_{max} - j_{min} + 1$;

where w is a width of an extracted area, and l is a length of the extracted area;
  the extracted area for each the segmented path being: $[i_{min}:i_{max}, j_{min}:j_{max}]$;
  building an adjacency matrix for each the segmented path;
  optimizing each the segmented path; and
  obtaining an optimization result for the n numbers of segmented paths;
wherein the path planning method further comprises:
  controlling a mobile robot to move along the optimized full path.

2. The path planning method of mobile robots based on image processing according to claim 1, wherein the preprocessing of the map image further comprises:
  binarizing the map image to obtain a binarized map image, and setting the safety range on the binarized map image.

3. The path planning method of mobile robots based on image processing according to claim 1, wherein setting the safety range and marking the safety range comprises:
  calculating the safety distance and the safety range based on the external geometric features of the mobile robot;
  identifying boundary points of the obstacle on the map image;
  obtaining coordinates of one of the boundary points;
  marking points in the map image within a circular safety range set with the one of the boundary points of the obstacle as a center as 0;
  repeating the operation of obtaining coordinates of one of the boundary points to the operation of marking points in the map image within a circular safety range set with the one of the boundary points of the obstacle as a center as 0 until the boundary points are set with safety ranges.

4. The path planning method of mobile robots based on image processing according to claim 1, wherein the splicing the n numbers of segmented paths after the optimizing to obtain an optimized full path, comprises:
  setting a coordinate matrix of the n numbers of segmented paths;
  deleting redundant points on each of the n numbers of segmented paths to obtain a further optimized segmented path;
  recording coordinates (i, j) of each of path points in each the segmented path;
  obtaining a coordinate position of each the path point in the map image and recording the coordinate position:

$$\begin{cases} i' = i_{min} + i - 1; \\ j' = j_{min} + j - 1; \end{cases}$$

wherein (i', j') is coordinates of the path point in the map image;
  inputting the coordinates (i', j') of each the path point of each the segmented path into a path coordinate matrix to complete the splicing of the n numbers of segmented paths.

5. A path planning method of mobile robots based on image processing, comprising:
  preprocessing of a map image: calculating a safety distance s between a mobile robot and a surrounding obstacle during a movement of the mobile robot based on external geometric features of the mobile robot, forming a circular range on the map image with a boundary point of the obstacle as a center and the safety distance s as a expansion radius to set a safety range, and marking the safety range; performing skeleton feature extraction on the map image after the marking to obtain a reference path map;
  obtaining of an initial path: building an adjacency matrix, and performing path solution on the reference path map based on the adjacency matrix to obtain the initial path;
  optimizing the initial path, comprising:
    performing neighborhood expansion on the initial path to obtain an expansion path;
    performing segmentation on the expansion path to obtain n numbers of segmented paths, and optimizing the n numbers of segmented paths separately;
    splicing the n numbers of segmented paths after the optimizing to obtain an optimized full path, comprising:
      setting a coordinate matrix of the n numbers of segmented paths;
      deleting redundant points on each of the n numbers of segmented paths to obtain a further optimized segmented path;
      recording coordinates (i, j) of each of path points in each the segmented path;

obtaining a coordinate position of each the path point in the map image and recording the coordinate position:

$$\begin{cases} i' = i_{min} + i - 1; \\ j' = j_{min} + j - 1; \end{cases}$$

wherein (i', j') is coordinates of the path point in the map image;

inputting the coordinates (i', j') of each the path point of each the segmented path into a path coordinate matrix to complete the splicing of the n numbers of segmented paths;

controlling a mobile robot to move along the optimized full path.

* * * * *